CATHODE RAY TUBE SCANNING CIRCUIT

Filed Oct. 31, 1952 3 Sheets-Sheet 1

WILLIAM M. LYNCH
WILLIAM E. EVANS, JR.
INVENTORS

BY Lyon & Lyon
ATTORNEYS

May 8, 1956 W. M. LYNCH ET AL 2,745,005

CATHODE RAY TUBE SCANNING CIRCUIT

Filed Oct. 31, 1952 3 Sheets-Sheet 2

WILLIAM M. LYNCH
WILLIAM E. EVANS, JR.
INVENTORS

BY Lyon & Lyon
ATTORNEYS

WILLIAM M. LYNCH
WILLIAM E. EVANS, JR.
INVENTORS

BY Lyon & Lyon

ATTORNEYS 2,745,005

CATHODE RAY TUBE SCANNING CIRCUIT

William M. Lynch, Palo Alto, and William E. Evans, Jr., Menlo Park, Calif., assignors to Technicolor Motion Picture Corporation, Hollywood, Calif., a corporation of Maine Application October 31, 1952, Serial No. 317,858

2 Claims. (Cl. 250—27)

This invention relates to scanning circuits in cathode ray tubes. More particularly, the invention relates to circuits for scanning the electron beams in a cathode ray tube containing more than one electron gun, which guns are disposed in an off-axis position.

It has been proposed to employ, particularly for color television, kinescopes including screens which comprise a multiplicity of projecting groups of contiguous elemental surfaces or facets, the facets of each group being coated with a different type luminescent material to produce, when impacted by a beam of electrons, light of different colors. The selected colors are such that each group of facets will substantially reproduce the corresponding portion of the desired image in its natural color. Screens of this type are described in the patents to Geer No. 2,480,848 and to Goldsmith No. 2,481,839. As set forth in each of these patents, by employing such a non-planar type screen, color information can be controlled by the striking angle of the electron beam in the kinescope. For example, the screen may be constructed to contain a plurality of projecting trihedral pyramids, the contiguous facets of each being coated with materials which will fluoresce, respectively, to produce light of three additive primary colors, red, green and blue. Further, the geometrically corresponding facets of each pyramid may be coated with the same material so as to provide three systems of facets, each of which will produce light of one of the primary colors. In place of such a three-color system, screens have been proposed having projections containing two or four contiguous facets, and in each case the geometrically corresponding facets are coated with a fluorescent material which will yield light of the proper color to additively produce the natural color of the desired image.

Regardless of the particular configuration of the screen employed, however, it is necessary in kinescopes of this type that the respective electron beams strike the surface of the screen at different angles. In order to accomplish this result, it has been found preferable to separate the electron guns, disposing the axis of each at an angle to the central axis of the tube. Such expedient, while taking advantage of the color directivity of the tube, gives rise to several types of distortion not present in conventional systems. Thus, conventional cathode ray tubes such as those used for black and white television have but a single electron gun which is on axis, that is, on an axis perpendicular to the center of the screen. A rectangular picture is scanned by deflecting the beam horizontally from left to right at the line rate and vertically from top to bottom at the field rate in much the same way as the eye scans in reading a printed page. The position of the spot on the screen is changed in a sawtoothed fashion so that the visible portion takes nearly the entire period of the cycle and the retrace or fly-back takes only a small fraction of the cycle, the beam being normally cut off during retrace. The deflection in either direction, for all practical purposes, is linear, equal angles sweeping out at equal intervals on the face of the tube, and the deflection in one direction is nearly independent of the deflection in the other direction. When off-axis guns are employed, however, both keystoning and nonlinearity occur, with the result that it is necessary to incorporate in the scanning circuits correction circuits for each of these types of distortion. The situation is further complicated by the fact that the angular relationship between the respective rasters of the different guns will normally be such that rotation of one or more rasters is required to properly superimpose the rasters from each gun and thereby reproduce the image in natural colors. This necessitates further modification of conventional scanning wave forms. In accordance with the instant invention, circuits are provided which incorporate the necessary corrections and modifications to conventional scanning wave forms to accomplish this desired result.

The instant invention will be described with reference to a non-planar type television screen incorporating projecting trihedral pyramids wherein the adjacent facets of each pyramid are coated with one of the primary colors. Consequently, three separate off-axis electron guns are employed. It is to be understood, however, that the invention is not so limited and is equally applicable to other types of cathode ray tubes such, for example, as those employing two or four off-axis guns. In addition, the present invention will be described with reference to such a tube wherein the guns are oriented in a particular fashion about the screen which materially simplifies the scanning wave form for one gun. Again, the invention is not limited to this particular orientation.

Figure 6A:
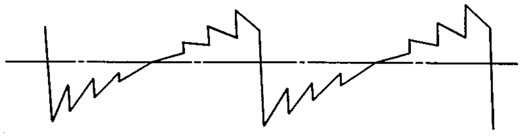
Figure 6B:
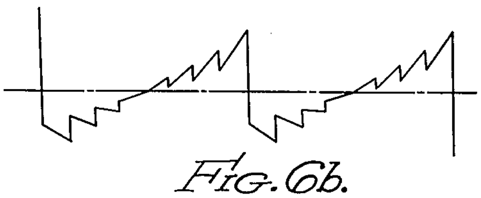

Figures 6*a* and 6*b* illustrate typical scanning wave forms suitable for correcting keystone distortion caused by the position of the red gun and blue gun.

Figure 5:
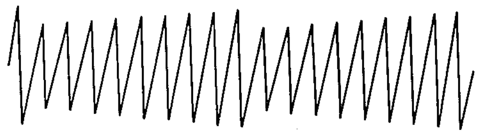
Figure 5 illustrates a scanning wave form suitable for correcting keystone distortion caused by the position of the green gun.
Figure 7:
Figure 8A:
Figure 8B:

Figure 7 illustrates the "keystone correction wave form" which can be employed to obtain the wave forms shown in Figures 5 and 6;

Figure 8(*a*) illustrates an accelerated low frequency wave form suitable for correcting for nonlinearity distortion resulting from the green gun;

Figure 8(*b*) illustrates an accelerated high frequency wave form suitable for correcting for non-linearity distortion resulting from the blue gun.

Figure 9A:
Figure 9B:
Figure 10:
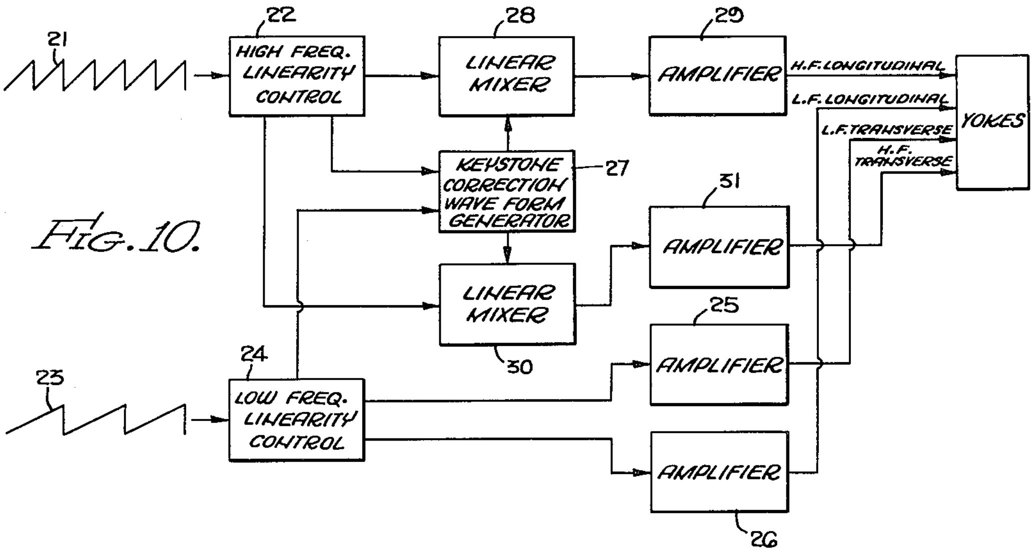
Figure 11:
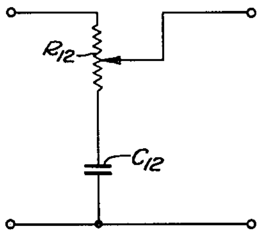
Figure 12:
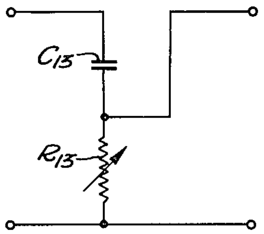
Figure 13:
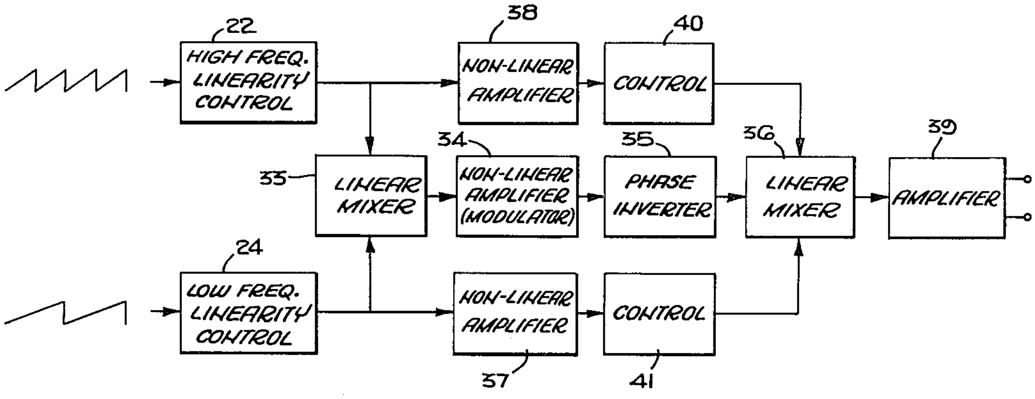
Figures 14, 15:
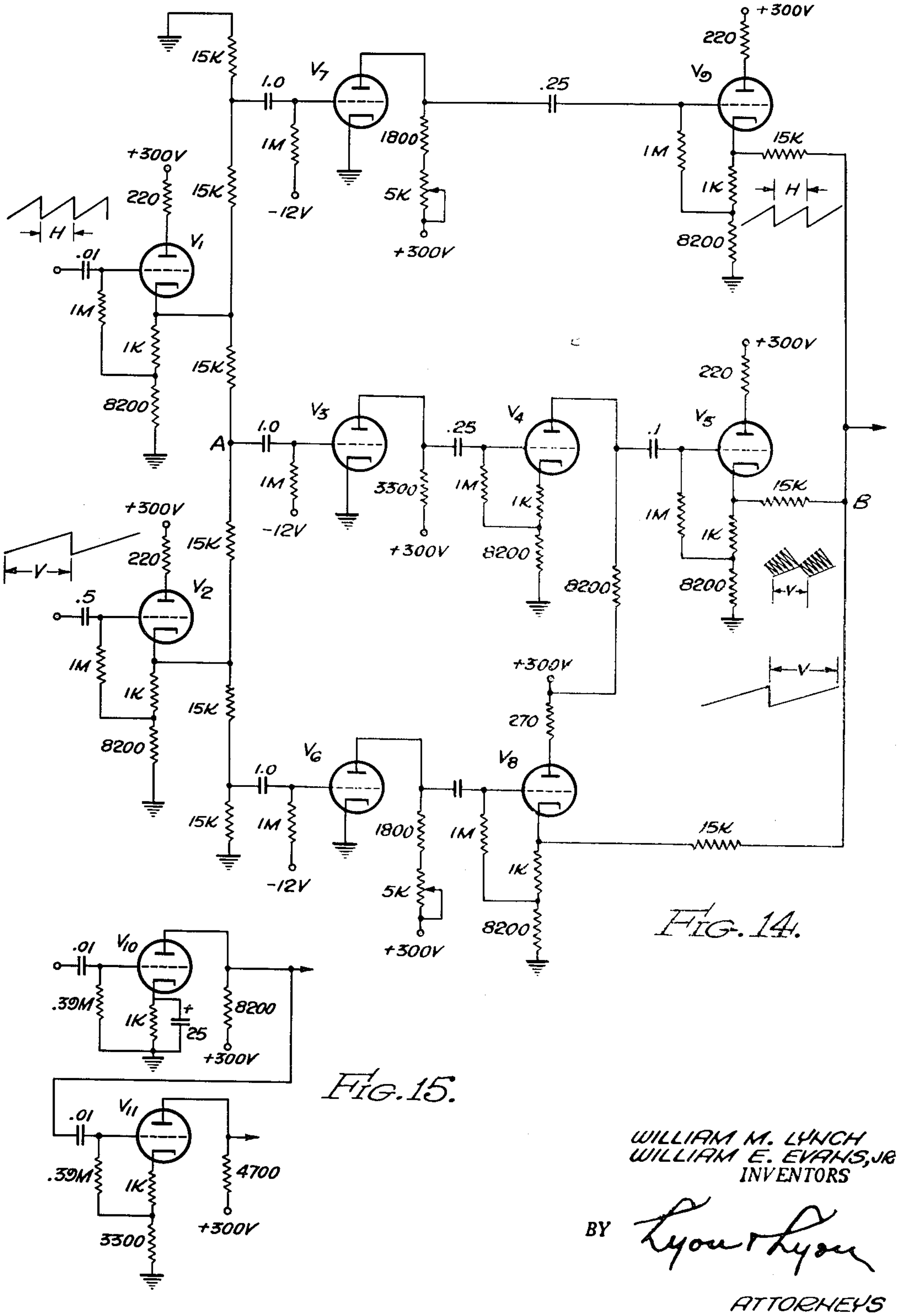

Figure 9(*a*) illustrates a decelerated low frequency wave form suitable for correcting for non-linearity distortion resulting from the red or blue gun;

Figure 9(*b*) illustrates a decelerated high frequency wave form suitable for correcting for non-linearity distortion resulting from the red gun;

Figure 10 is a block diagram of a deflection system embodying the present invention;

Figure 11 illustrates a circuit for accelerating a sawtooth wave form;

Figure 12 illustrates a circuit for decelerating a sawtooth wave form;

Figure 13 illustrates in block diagram form a circuit for obtaining a keystone correction wave form in accordance with the present invention;

Figure 14 is a schematic of the circuit illustrated in Figure 13; and

Figure 15 illustrates a circuit for amplifying and inverting a keystone correction wave form in accordance with the present invention.

Figure 1:
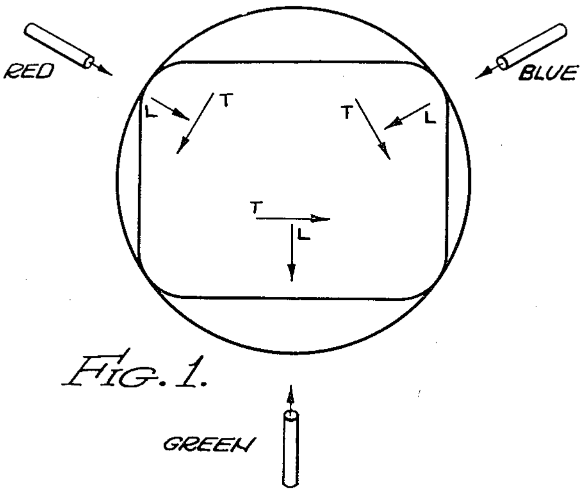
Figure 1 illustrates diagrammatically the orientation of the electron guns with respect to the front of the tube face.

In Figure 1, there is shown diagrammatically a color television tube of the type to which the present invention is directed, wherein one gun, designated the green gun, is located at the bottom of the picture, and the red and blue guns are located in the upper corners 120° from the green gun. The deflection distance, that is, the distance from the center of the deflection to the center of the screen, is chosen as a compromise between excessive color distortion caused by overplay of the electron beams onto the incorrect facets of the projecting screen elements and the size of the tube.

Figure 2:
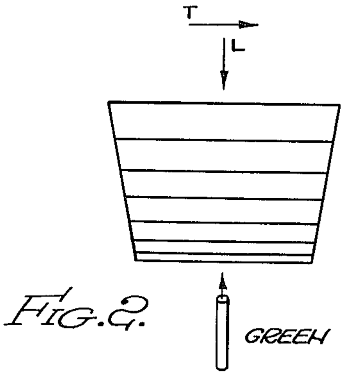
Figure 2 illustrates the distortion resulting from the green gun scanned with uncorrected scanning wave forms.
Figure 4:
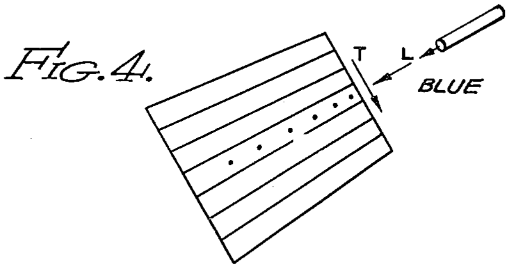
Figure 4 illustrates the distortion resulting from the blue gun scanned with uncorrected scanning wave forms.
Figure 3:
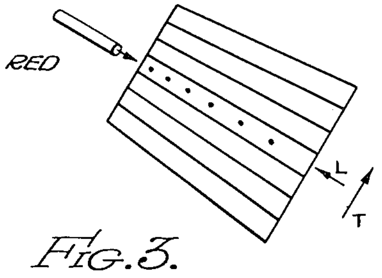
Figure 3 illustrates the distortion resulting from the red gun scanned with uncorrected scanning wave forms.

Figures 2, 3 and 4 illustrate the rasters which will result from each gun in the absence of any correction. In these figures, both the keystone and non-linear effects have been exaggerated for ease of illustration. While, as above noted, both keystone and non-linearity must be corrected for best results, there will first be described the corrections necessary to the scanning wave forms for each gun to eliminate the problem of keystone. Figure 2 illustrates the raster which would be scanned by the green gun if conventional, linear saw-tooth wave forms were used, such as would be used to scan a linear rectangular raster on a conventional cathode ray tube. As seen, the raster is distorted or keystoned, that is, it is trapezoidal in shape. This keystone distortion of the green raster arises because the deflection sensitivity in the horizontal direction (along the indicated T or transverse axis) changes as a function of the displacement in the vertical direction. This keystone distortion can be corrected by properly modulating the high frequency scanning to change its amplitude as a function of its vertical position, that is, at a vertical rate. Such wave form, shown in Figure 5, is well known for keystone correction, having been developed for other single-gun off-axis tubes, such, for example, as the iconoscope. While such wave form would be suitable to correct for keystoning were only the green gun employed, it is unsatisfactory to effect a correction for the blue and red guns. In accordance with the present invention, a "keystone correction wave form" is developed which is employed to obtain the necessary wave form for the green gun shown in Figure 5, and which is also employed to effect the keystone correction for the red and blue guns. This keystone correction wave form will now be described.

In scanning the green raster, the conventional orientation of the deflecting system may be used, that is, the deflection yokes are arranged to produce deflection in two directions at right angles to each other in vertical and horizontal directions. As regards the blue and red guns, however, if the deflection yoke is lined up to deflect a geometrically horizontal line at the center of the red raster, a line scanned from the other set of coils will not be vertical but will be skewed. Since the orientation in which the beam is deflected along the indicated longitudinal and transverse axes is the only one in which traces produced from an orthogonal deflection system are orthogonal on the face of the tube, it has been found preferable to employ these axes, which are oblique to the horizontal and vertical axes of the screen, to scan from the red and blue gun positions. Moreover, it has been found preferable to scan each of these guns in such manner that the major high frequency deflection is along the longitudinal axis and the major low frequency deflection is along the transverse axis. When this is done, keystoning of the respective red and blue rasters results, as illustrated in Figures 3 and 4. The wave form applied along the transverse axis, that is, the low frequency saw-tooth, must be corrected for keystone distortion. This can be accomplished by amplitude modulating the low frequency signal at the high frequency rate. Typical modulated low frequency wave forms are shown in Figure 6. Analysis of this wave form shows that it consists of two additive components, the first of which is the low frequency saw-tooth and the other of which is a wave, illustrated in Figure 7, which will be referred to hereinafter as the "keystone correction wave form." Further analysis demonstrates that this keystone correction wave form results if the high frequency saw-tooth is subtracted from the wave form shown in Figure 5, that is, from the high frequency wave form modulated by the low frequency wave form. Accordingly, it has been found that the keystone correction wave form is the modulation product or side band energy which results when the high frequency saw-tooth is modulated by the low frequency saw-tooth. This keystone correction wave form, once obtained, can be utilized to effect keystone correction caused by the green gun by merely linearly adding it to the high frequency saw-tooth. The proper wave form to effect keystone correction caused by the red and blue guns is obtained simply by adding the keystone correction wave form in proper phase, polarity and magnitude to the low frequency saw-tooth.

Were it necessary merely to obtain a rectangular raster from the red and blue guns, it would only be necessary to linearly add to the low frequency saw-tooth the keystone correction wave form. It is necessary, however, to rotate the rasters from each of these guns in order that they may be superimposed upon each other and upon the green raster to reproduce the desired image in registration. Thus, the red raster shown in Figure 3 must be rotated 30° in a counterclockwise direction to register over the green raster, and the blue raster must be rotated a like amount in the opposite direction. Such rotation is accomplished by "cross coupling" the signals employed to scan along the indicated longitudinal and transverse axes. This is done by linearly adding to the low frequency scan a wave corresponding to that used for the high frequency scan and by adding to the high frequency scan a wave corresponding to that for the low frequency scan. Thus, a high frequency wave is applied along the transverse axis to skew the center line around until it becomes horizontal, and a low frequency signal is applied along the longitudinal axis to skew the sides of the resulting raster until they are vertical.

From the above it is seen that to rotate the raster and also to correct for keystoning, complex wave forms must be applied to both the high frequency and the low frequency deflection coils of the red and blue guns. Thus, considering first the coils which deflect the electron beam to scan the transverse axis, there must be applied for keystone correction a low frequency saw-tooth to which has been added the keystone correction wave form. To rotate the raster there must be also applied to these coils the high frequency saw-tooth. To the longitudinal coils, no keystone correction as such is required before rotation, so that the high frequency saw-tooth simply need be applied. To effect rotation of the raster, however, a complex scanning wave similar, except for polarity, to that existing in the transverse coils must also be applied. This wave consists of the low frequency saw-tooth to which has been added the correction wave form. It can therefore be seen that the wave form applied to both the longitudinal and transverse coils consists of an additive combination of the high frequency saw-tooth, the low frequency saw-tooth, and the keystone correction wave form. By applying these various waves in proper phase, polarity and magnitude to the coils of the red and blue guns, both keystone correction and the necessary raster rotation are achieved.

As above noted, keystone correction of the green gun is accomplished by applying the wave form of Figure 5. This wave form is obtained simply by adding, in proper phase and polarity, the keystone correction wave form to the high frequency saw-tooth. Since it is unnecessary to rotate the green raster, no "cross coupling" is required and a rectangular raster is obtained by employing only the low frequency saw-tooth for the low frequency coils.

It is thus seen that, in accordance with the present invention, the "keystone correction wave form" is employed to correct for keystoning for each of the three guns of the tube. This greatly simplifies the scanning circuits which would otherwise be necessary. A circuit for obtaining this wave form will be later described.

While the present invention is directed primarily to the problem of correcting keystone distortion of the rasters produced by each of the three guns and rotation of two of these rasters in order that the three may be registered upon the screen, it has been found that an additional type of distortion results when off-axis guns are employed which must be corrected for applications wherein a high degree of registration over the entire raster of the images produced by the three guns is desired. Such distortion will be referred to herein as non-linear distortion and arises because, with an off-axis gun, the deflection sensitivity changes as a function of displacement along the longitudinal axis of the electron beam. Referring to Figure 2, the non-linear distortion of the image formed by the green gun is illustrated. Thus, the deflection sensitivity in the vertical direction increases with vertical displacement of the electron beam. The result is that the spacing between the horizontal lines, which should be equally spaced, decreases toward the bottom of the raster. In order to obtain vertical linearity on the screen, it is necessary to predistort the vertical signal by accelerating the low frequency saw-tooth, as shown in Figure 8.

Non-linear distortion similar to that above described for the green gun occurs in the red and blue guns and is represented by the dots shown along the central line of the uncorrected raster illustrated in Figures 3 and 4. It should be noted that, with the scan employed, this non-linearity occurs in the direction of the high frequency scan rather than the low frequency scan, as in the case of the green gun. It is not possible, however, as in the case of the green gun, to correct for this non-linear distortion simply by predistorting the high frequency scanning wave since, as above described, cross coupling between high and low frequency scanning waves is necessary to rotate these rasters. As the deflection along the transverse axis is a function of the deflection along the longitudinal axis, it is necessary to predistort the wave forms along each axis. It has been found, however, that the correction required along the transverse axis is the same as that needed to correct for linearity along the longitudinal axis. Thus, for the red gun, the general wave forms required are shown, Figure 9(*a*) illustrating a decelerated low frequency saw-tooth and Figure 9(*b*) a decelerated high frequency saw-tooth. The blue gun requires a decelerated low frequency saw-tooth as in Figure 9(*a*) and an accelerated high frequency saw-tooth as in Figure 8(*b*). Circuits for effecting these predistortions will be later described.

As above described for the red and blue guns, it is necessary to apply to each deflection coil a low frequency saw-tooth, a high frequency saw-tooth, and the keystone correction wave form. This presents a difficulty where conventional yoke and transformer combinations are employed. Thus, with electromagnetic deflection, it is generally necessary to employ transformer coupling; and while the high frequency waves, which include the keystone correction wave form, can be readily transmitted to the high frequency coils and the low frequency waves to the low frequency coils, a problem is presented in designing a system wherein adequate band widths are obtained for all such waves. It has been found that when conventionally designed components are used the frequency response of the low frequency coils and transformers is inadequate to handle the high frequency signals, and the response of the high frequency coils and transformers is inadequate to handle the low frequency signals. While this problem can be reduced in several ways, it has been found that a satisfactory solution to it is to incorporate double yokes for each gun. Thus, for each direction of scanning, both a high frequency and a low frequency coil can be employed. To the high frequency coil is applied a high frequency saw-tooth and the correction wave form, and to the low frequency coil is applied the low frequency saw-tooth.

Figure 10 illustrates in block diagram form a deflection system embodying the present invention which may be used for either the red or blue guns. As seen, the double yoke arrangement above described is employed. A high frequency linear saw-tooth 21 is applied to the high frequency linearity control 22. The purpose of the control 22 is to predistort the high frequency saw-tooth in the manner illustrated in Figure 8(*b*) or Figure 9(*b*), depending upon the gun, red or blue, for which the deflection system is to be used. In like manner, a linear low frequency saw-tooth 23 is applied to a low frequency linearity control 24 which predistorts such saw-tooth for linearity correction to the shape shown in Figure 9(*a*). The output of the control 24 is applied through an amplifier 25 to the low frequency transverse coils as indicated. The output of amplifier 25 is preferably made variable for ease of adjustment of the system. Similarly, the output of control 24 is applied through a second variable gain amplifier 26 to the low frequency longitudinal coils as indicated. The outputs of controls 22 and 24 are also applied to the keystone correction wave form generator 27, which unit generates the keystone correction wave form illustrated in Figure 7. The keystone correction wave form is added to the output of the high frequency linearity control in a mixer 28, amplified by variable amplifier 29, and applied to the high frequency longitudinal deflection coil. Similarly, a keystone correction wave form is additively combined with the output of the control 22 in a second and similar mixer 30 and applied to the high frequency transverse deflection coil through a variable amplifier 31. With this arrangement, each high frequency coil is supplied with a keystone correction wave form and the high frequency saw-tooth, corrected for linearity; and each low frequency coil is supplied with the low frequency saw-tooth corrected for linearity. The outputs of the various units, including the keystone correction wave form generator 27, may be made variable to facilitate proper adjustment of the system.

Circuits for the linearity control units 22 and 24 are of conventional design and need not therefore be described in detail. By way of example, however, the predistortion of the saw-tooth waves can be readily accomplished by employing simple RC networks. For example, the accelerated saw-tooth shown in Figure 8 can be obtained by applying a linear saw-tooth to the network shown in Figure 11 wherein is added to the saw-tooth wave form the integral of such wave form which is developed across C12. The time constant of R12—C12 has to be large compared with the period of the saw-tooth involved. For convenience, a tap is provided on R12 to permit modification of the output wave form. The decelerated saw-tooth shown in Figure 9 can be obtained by employing a circuit such as that shown in Figure 12. Here the integrated wave form which appears across the condenser C13 is subtracted from the linear saw-tooth input. For properly shaping the wave form, a variable resistance R13 may be employed. Units 22 and 24 may, if desired, include conventional amplifiers, and, in addition, the various outputs from these units shown in Figure 10 may be made variable.

As previously described, the keystone correction wave form generator is utilized to develop the keystone correction wave form shown in Figure 7, and consists of a circuit which amplitude modulates the high frequency saw-tooth by the low frequency saw-tooth and derives the modulation product therefrom. Several different types of modulators and associated circuits can be employed to accomplish this result. A preferred circuit is shown in block diagram form in Figure 13 in which the modulator is a simple non-linear amplifier in the form of a triode biased nearly to cutoff.

As seen in Figure 13, the outputs of the linearity control units 22 and 24 are applied to a mixer stage 33 where they are linearly added. The output of the mixer stage is applied to the amplifier 34 which, because of its non-linear characteristic, causes intermodulation of the two applied waves. The output of the non-linear amplifier is applied through a phase inverter 35 to a final linear mixer 36. The output of the non-linear amplifier 34 contains additionally distorted horizontal and vertical saw-tooth wave forms as well as the desired modulation products. To obtain only the desired modulation product, the keystone correction wave form, it is necessary to remove from the output of the non-linear amplifier 34 the horizontal and vertical saw-tooth wave forms. This is accomplished in the following manner. The output of the low frequency linearity control 24 is fed through a non-linear amplifier 37 to the linear mixer 36. The characteristic of the amplifier 37 is made identical to that of the non-linear amplifier 34, with the result that the low frequency saw-tooth applied to the linear mixer 36 is distorted in a manner identical with that of the low frequency saw-tooth output of the non-linear amplifier 34. In like manner, the output of the high frequency linearity control 22 is applied through a non-linear amplifier 38 to the linear mixer 36. Again, the characteristic of the non-linear amplifier 38 is made identical with that of the non-linear amplifier 34, with the result that the high frequency saw-tooth applied to the linear mixer is distorted in the same manner as the high frequency saw-tooth wave contained in the output of the non-linear amplifier 34. Between the non-linear amplifier 34 and the linear mixer 36 is a phase inverter 35 to invert the phase of the output of the non-linear amplifier 34. The result of this phase inversion will be the cancellation of the high frequency and low frequency saw-tooth waves in the linear mixer 36. In the output of the linear mixer appears the desired keystone correction wave form. If desired, this may be fed to an amplifier 39. It is, of course, necessary for complete cancellation that the amplitude of the high frequency and low frequency saw-tooth waves applied to the linear mixer 36 be the same as those appearing in the output of the phase inverter 35. This can be readily accomplished by employing control units 40 and 41 to control the magnitude of the respective waves applied to the linear mixer.

The circuit shown in Figure 13 is illustrated schematically in Figure 14 wherein representative values of circuit parameters, which are given merely for the purpose of illustration, are shown for conventional television scanning standards, that is, low frequency scansion at the rate of 60 cycles per second and high frequency scansion at the rate of 15,750 cycles per second. The high frequency and low frequency saw-tooth waves, which have been predistorted to correct for linearity as previously described, are applied to tubes V1 and V2, respectively. These tubes may be connected as conventional cathode followers and are employed to isolate the high frequency and low frequency sources. The outputs of V1 and V2 are combined at A and are fed to a non-linear amplifier V3 which is biased nearly to cutoff so as to operate on a non-linear portion of its characteristic and thereby serve as a modulator. The output of tube V3 is fed to a phase inverter tube V4 the output of which is fed to a cathode follower stage V5. The low frequency output of V2 is also fed to a non-linear amplifier stage V6 operated to have the same characteristic as V3. In like manner, the high frequency saw-tooth output of V1 is fed to a similar non-linear amplifier V7. The output of V6 is fed to a cathode follower stage V8, and in like manner, the output of V7 is fed to a cathode follower stage V9.

As will be apparent from the above, the output of V8 consists of a distorted low frequency saw-tooth, the output of V9 consists of a distorted high frequency saw-tooth, whereas the output of V5 consists of a distorted high frequency saw-tooth, a distorted low frequency saw-tooth and their modulation products. Moreover, due to the action of V4, the phase of the output of V5 is inverted with respect to that of V8 and V9. The respective outputs are combined at B, with the result that the correction wave form illustrated in Figure 7 is produced.

As above described, it is necessary to apply the keystone correction wave form to the coils of both the transverse and the longitudinal axes. For proper correction, it is necessary that the phase of the correction wave form applied to one coil be inverted with respect to that of the correction wave form applied to the other coil. It is also desirable that the correction wave forms be amplified. This can be readily accomplished by the circuit shown in Figure 15. Thus, the wave form obtained from the circuit of Figure 14 is applied to a conventional amplifier V10. A portion of the output of V10 is applied to a second amplifier V11 the output of which is inverted in phase with respect to the output of V10. The outputs of the amplifiers V10 and V11 are then simply applied to the mixer units 28 and 30, respectively, of Figure 10. If desired, of course, additional amplifier stages may be employed.

As above noted, the circuit just described may be employed with either the red or the blue guns. The scanning circuit for the green gun is considerably simpler, inasmuch as this gun requires only a low frequency saw-tooth to be applied to the vertical coils and a high frequency saw-tooth plus a correction wave form to be applied to the horizontal coils. Linearity correction need be made only to the low frequency saw-tooth which can be accomplished by means of the circuit shown in Figure 12. The correction wave form, which is added, in proper phase and polarity relationship to the high frequency saw-tooth, can be obtained by means of a circuit similar to that shown in Figure 14.

As seen from the above, in accordance with the present invention, a circuit is provided for scanning a cathode ray tube employing a plurality of off-axis guns. In such circuit, means are provided for generating a keystone correction wave form which can be employed for each of the guns despite their different orientations with respect to the tube screen, it being merely necessary to add this keystone correction wave form in proper phase, polarity and amplitude to the conventional scanning waves for the respective guns. While the invention has been described with reference only to a system employing electromagnetic scanning, it is also applicable to systems employing electrostatic deflection.

It is to be understood that while specific circuits have been described herein, this has been done for the purpose only of illustrating the present invention, and that various changes and modifications in the details of these circuits may be made without departing from the invention.

We claim:

1. A circuit for deriving a keystone correction wave form adapted to correct for keystone distortion in a cathode ray tube scanned by an off-axis electron gun including a source of low frequency saw-tooth waves, a source of high frequency saw-tooth waves, a linear mixer for combining said waves, a non-linear amplifier for the combined waves, means for subtracting from the output of said non-linear amplifier a wave corresponding to said low frequency saw-tooth waves, and additional means for subtracting from the output of said non-linear amplifier a wave corresponding to said high frequency saw-tooth waves to obtain from said non-linear amplifier a wave corresponding to said keystone correction wave form.

2. A circuit for deriving a keystone correction wave form adapted to correct for keystone distortion in a cathode ray tube scanned by an off-axis electron gun including a source of low frequency saw-tooth waves, a source of high frequency saw-tooth waves, a linear mixer for combining said waves, a non-linear amplifier for the combined waves, a second and similar non-linear amplifier for the high frequency saw-tooth waves, a third and similar non-linear amplifier for the low frequency saw-tooth waves, and means for subtracting the outputs of the second and third non-linear amplifiers from the output of the first-mentioned non-linear amplifier to obtain a wave corresponding to said keystone correction wave form.

References Cited in the file of this patent

UNITED STATES PATENTS

| | | |
|---|---|---|
| 2,207,389 | Wendt | July 9, 1940 |
| 2,207,499 | Vance | July 9, 1940 |
| 2,363,822 | Wendt | Nov. 28, 1944 |
| 2,481,839 | Goldsmith | Sept. 13, 1949 |
| 2,534,557 | Ostreicher | Dec. 19, 1950 |